United States Patent
Kusuda et al.

(10) Patent No.: US 8,205,211 B2
(45) Date of Patent: Jun. 19, 2012

(54) APPLICATION SWITCHING WITHIN ELECTRONIC APPARATUS

(75) Inventors: Hirohisa Kusuda, Tokyo (JP); Yasuhiro Nishide, Tokyo (JP); Daisuke Tsujino, Tokyo (JP); Jun Yamazaki, Tokyo (JP); Takashi Katayama, Tokyo (JP)

(73) Assignee: Vodafone Group PLC, Newbury, Berkshire (GB)

( * ) Notice: Subject to any disclaimer, the term of this patent is extended or adjusted under 35 U.S.C. 154(b) by 1148 days.

(21) Appl. No.: 11/661,564

(22) PCT Filed: Aug. 25, 2005

(86) PCT No.: PCT/JP2005/015411
§ 371 (c)(1),
(2), (4) Date: Feb. 4, 2008

(87) PCT Pub. No.: WO2006/025250
PCT Pub. Date: Mar. 9, 2006

(65) Prior Publication Data
US 2008/0263568 A1   Oct. 23, 2008

(30) Foreign Application Priority Data
Aug. 31, 2004  (JP) ................................. 2004-252154

(51) Int. Cl.
*G06F 9/46* (2006.01)
(52) U.S. Cl. .......................... 718/108; 719/310; 715/700
(58) Field of Classification Search .................. 718/108; 719/310; 715/700
See application file for complete search history.

(56) References Cited

U.S. PATENT DOCUMENTS

| | | | |
|---|---|---|---|
| 2003/0085870 A1* | 5/2003 | Hinckley | 345/156 |
| 2004/0092284 A1 | 5/2004 | Satoh et al. | |
| 2005/0130715 A1 | 6/2005 | Fujisawa | |
| 2011/0267263 A1* | 11/2011 | Hinckley | 345/156 |

FOREIGN PATENT DOCUMENTS

| | | |
|---|---|---|
| EP | 1271897 A2 | 1/2003 |
| EP | 1732298 A2 | 12/2006 |
| JP | H07-064754 | 3/1995 |
| JP | 2003-005879 | 1/2003 |
| JP | 2003 258955 A | 9/2003 |
| JP | 2004-112364 | 4/2004 |
| JP | 2004-153453 | 5/2004 |
| JP | 2004-228767 | 8/2004 |
| JP | 2004-235865 | 8/2004 |
| WO | WO 2004/020951 A1 | 3/2004 |

* cited by examiner

*Primary Examiner* — Andy Ho
(74) *Attorney, Agent, or Firm* — Muirhead and Saturnelli, LLC

(57) ABSTRACT

An electronic apparatus includes program memory means, application program execution means, and attitude detection means. The program memory means stores a plurality of application programs. The application program execution means executes an application program read out from the program memory means. The attitude detection means detects the attitude of the electronic apparatus. The application program execution means performs an application switching process to execute a second application program when detection data obtained by attitude detection performed by the attitude detection means during execution of a first application program or data obtained by computing the detection data changes across a predetermined threshold.

12 Claims, 12 Drawing Sheets

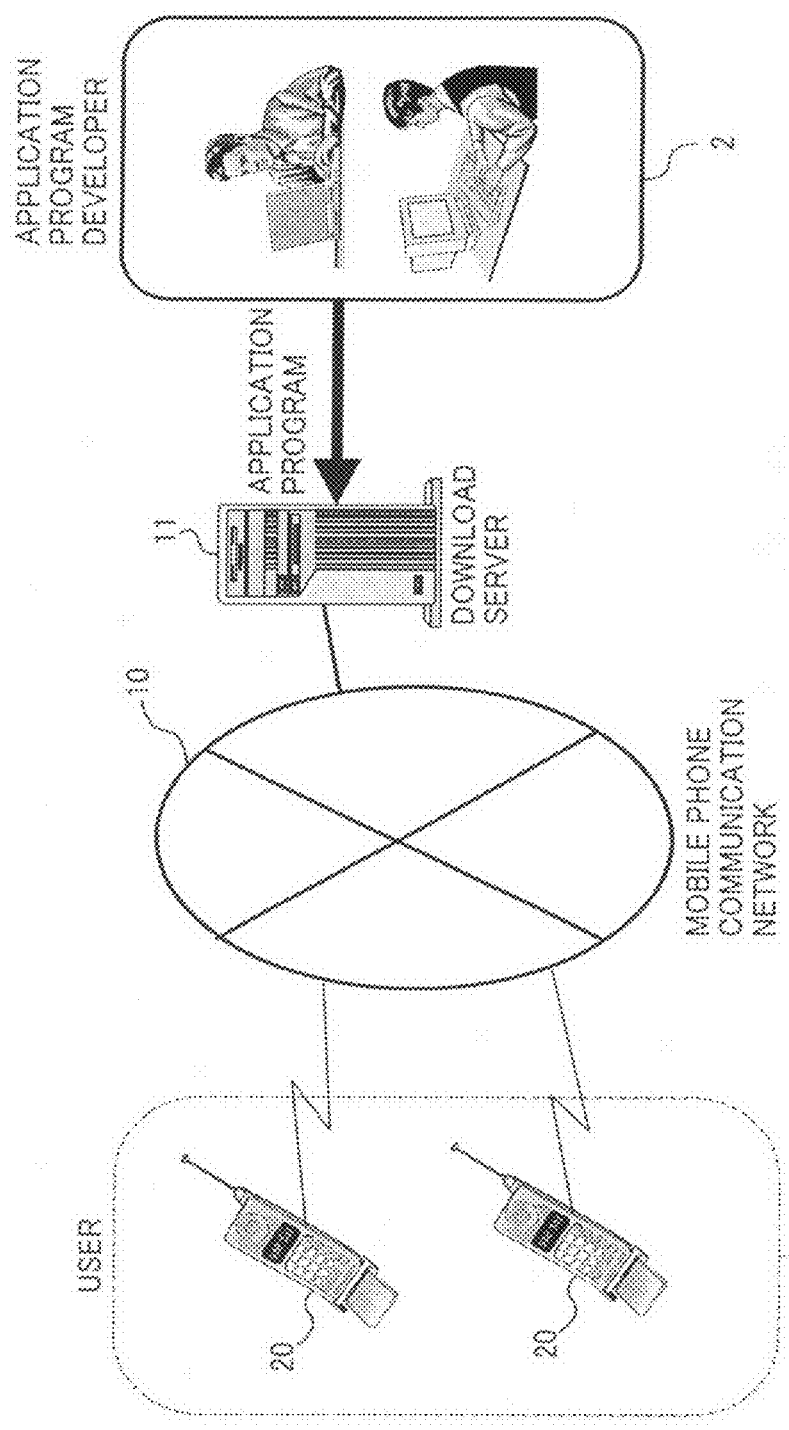
[Fig. 1]

[Fig. 2]
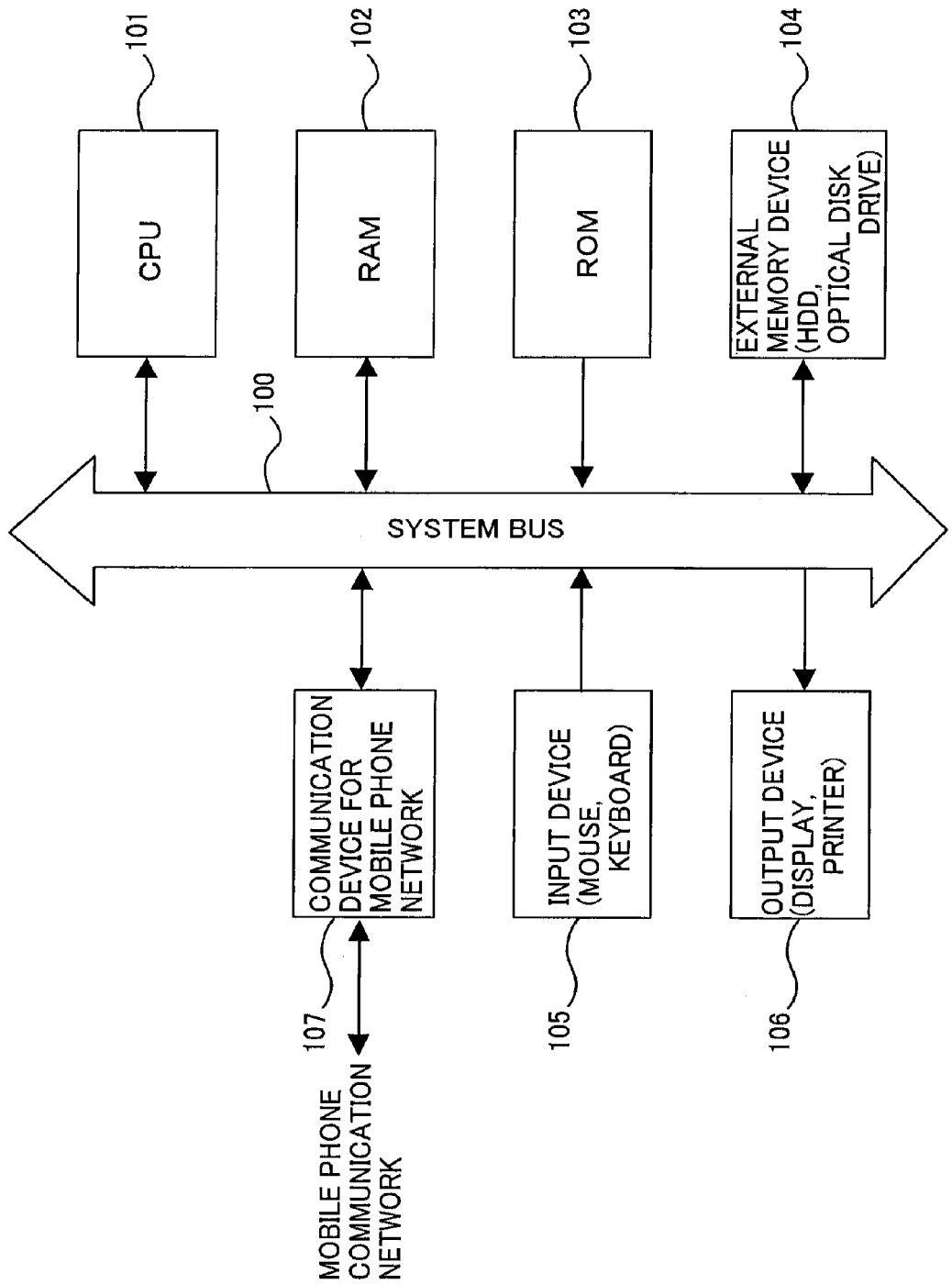

[Fig. 3A]
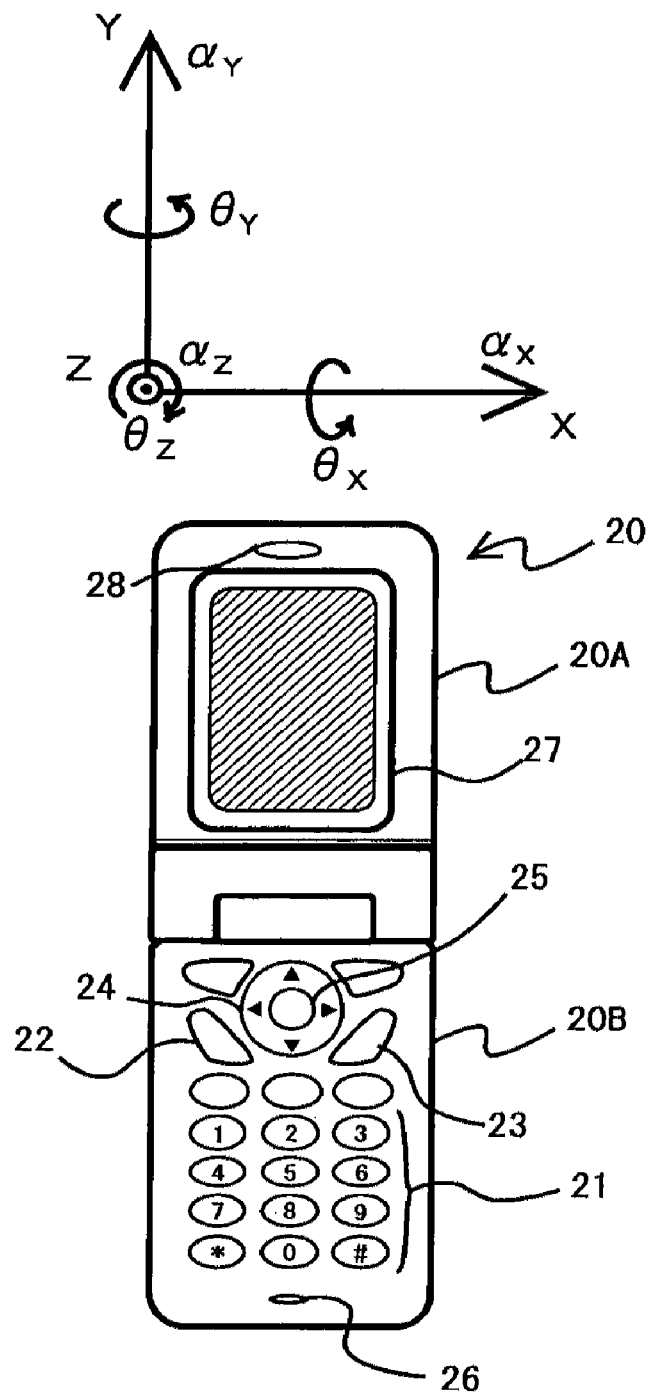

[Fig. 3B]
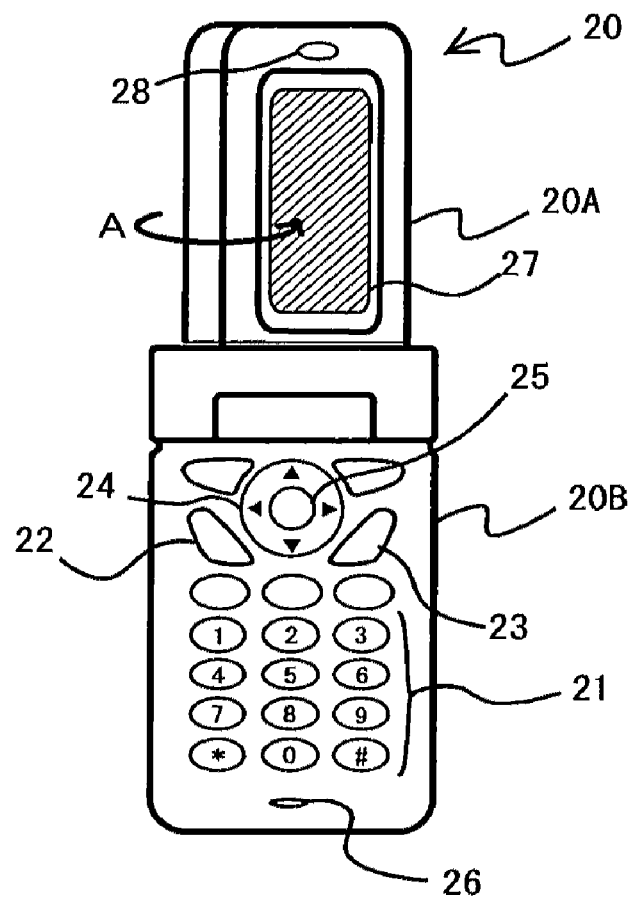

[Fig. 3C]
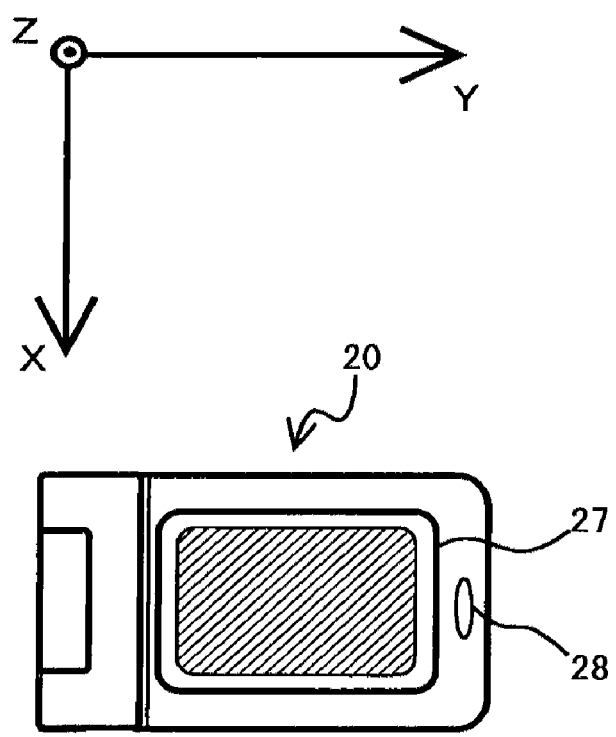

[Fig. 4]
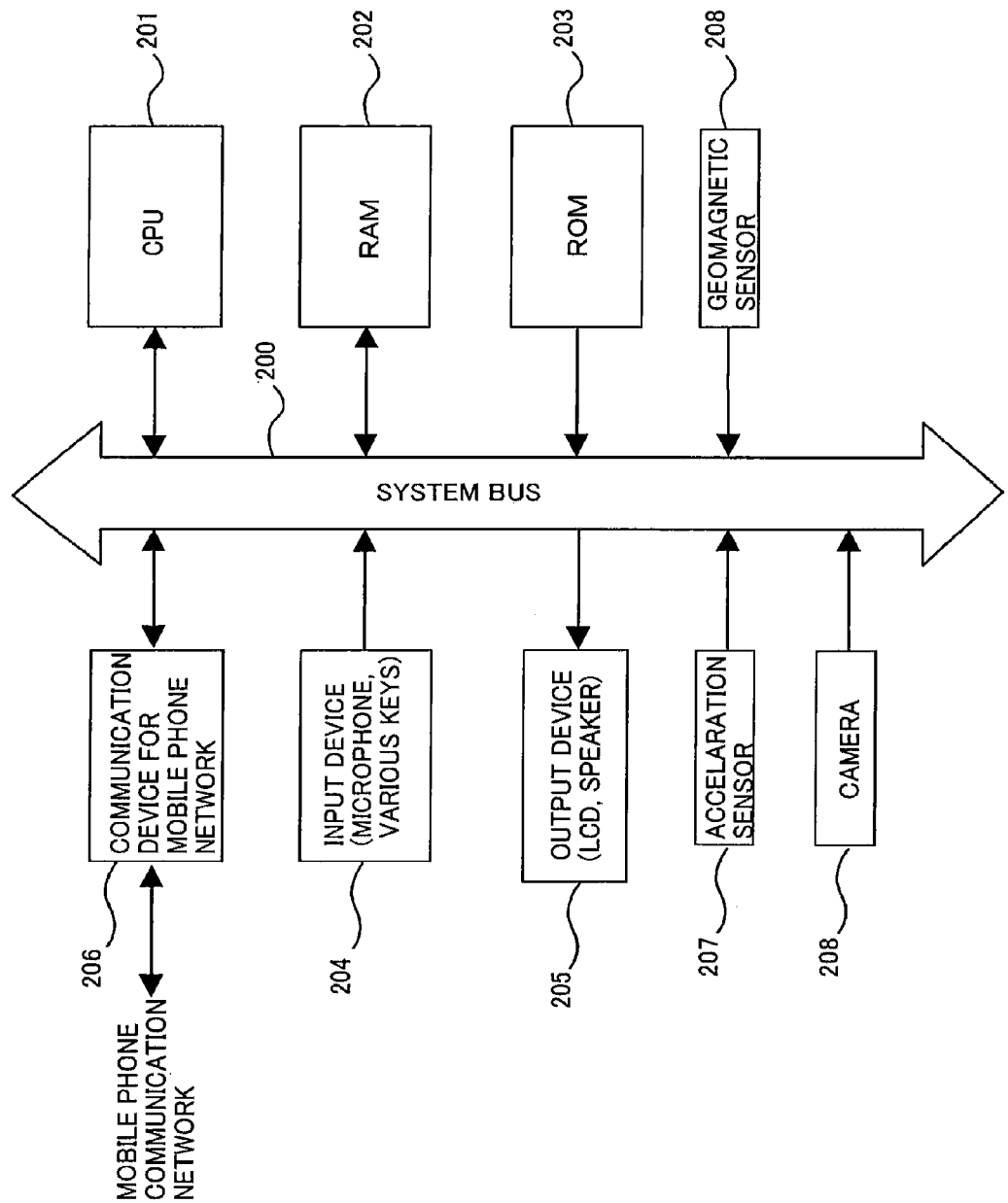

[Fig. 5]
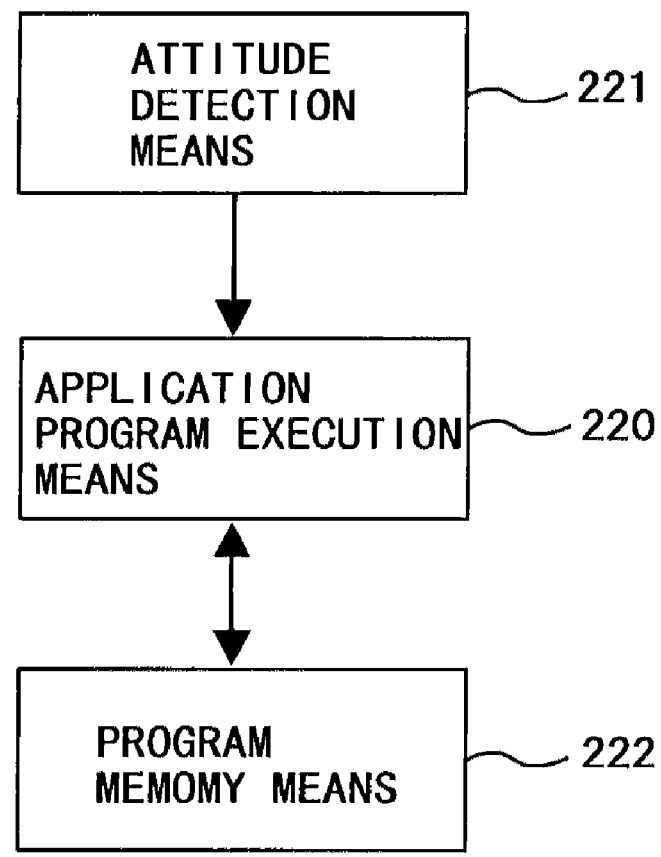

[Fig. 6]
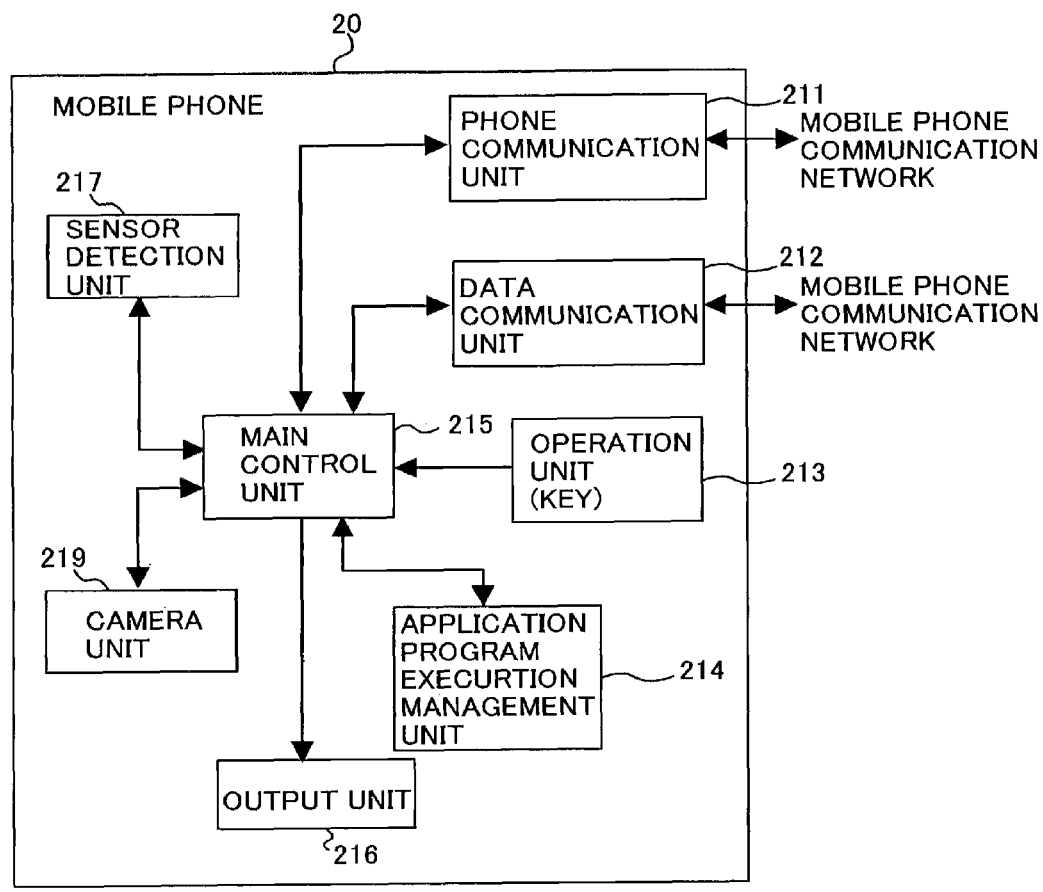

[Fig. 7]
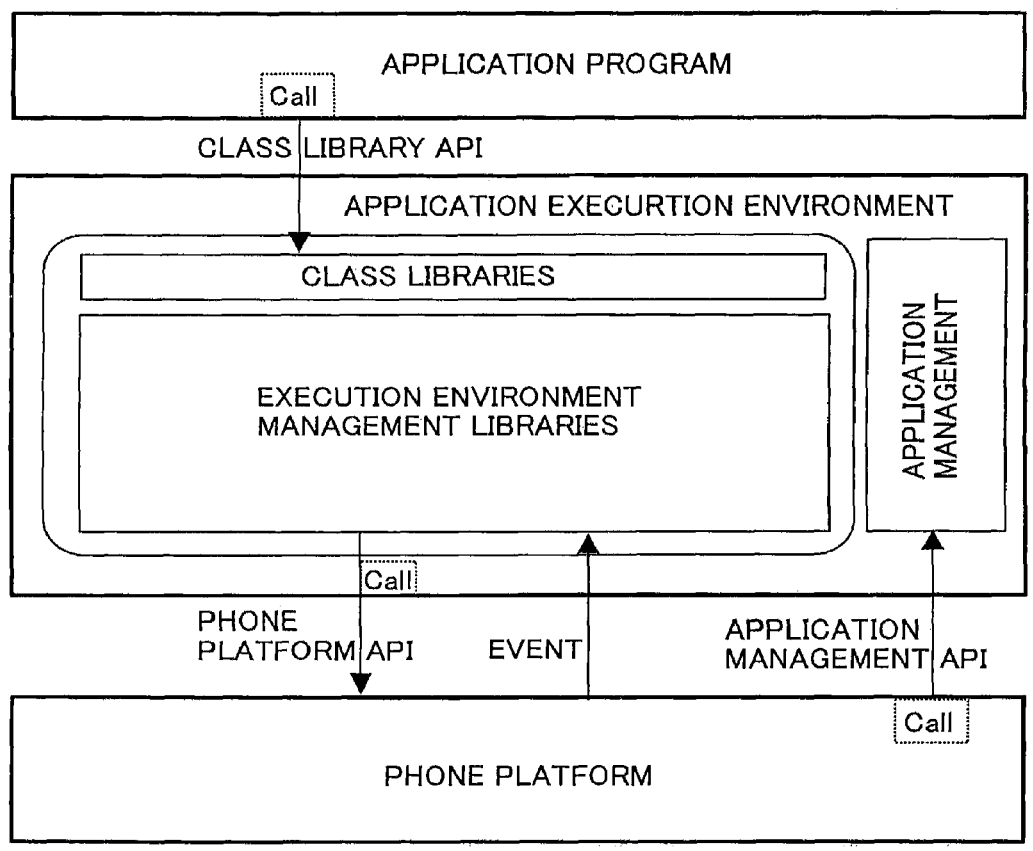

[Fig. 8]
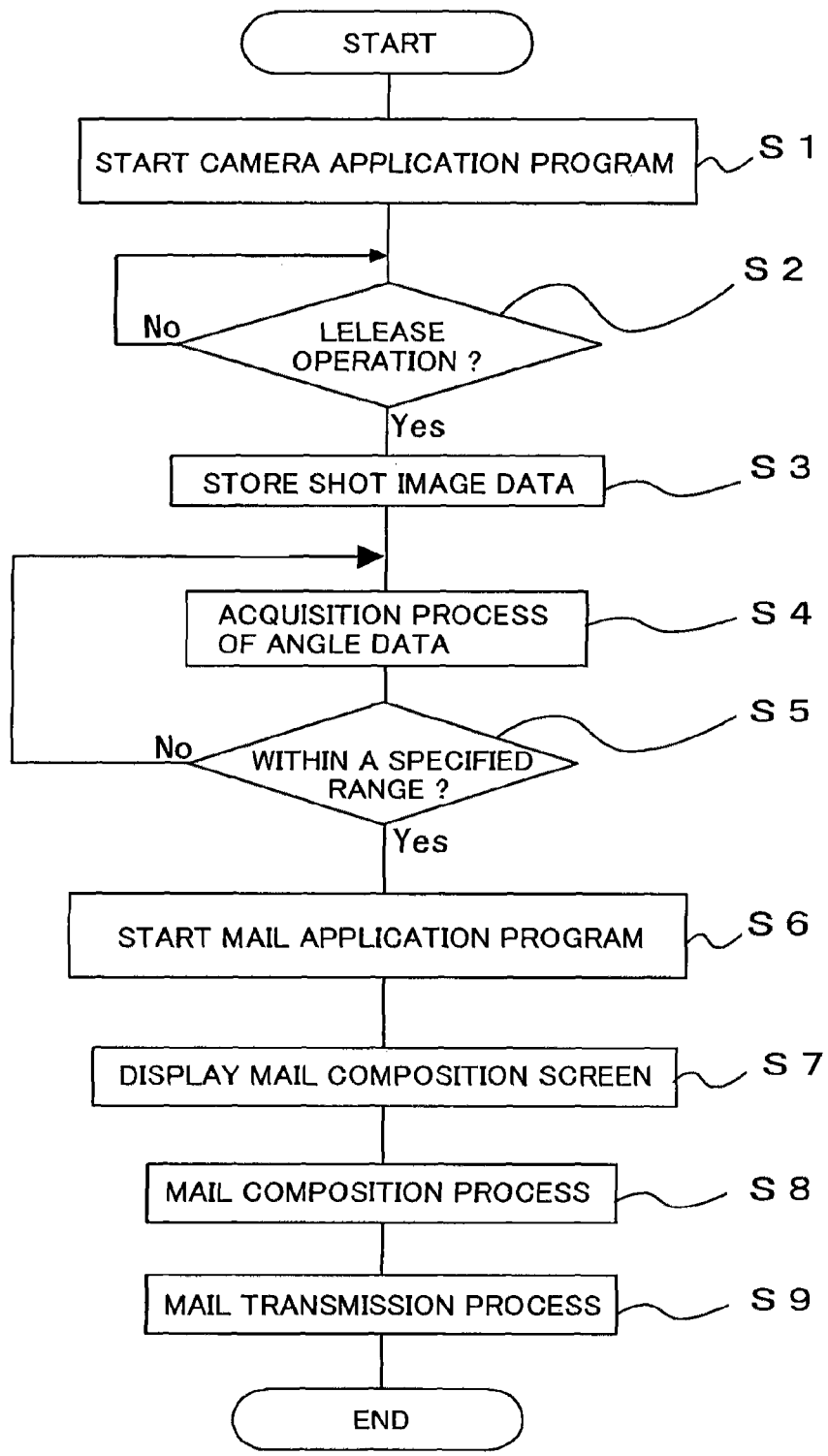

[Fig. 9A]
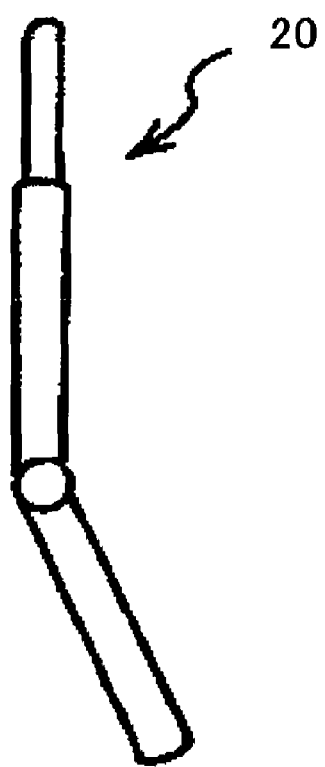

[Fig. 9B]
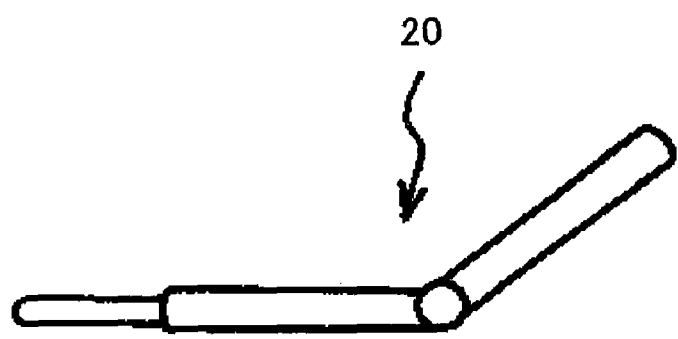

APPLICATION SWITCHING WITHIN ELECTRONIC APPARATUS

TECHNICAL FIELD

The present invention relates to an electronic apparatus such as a mobile communication terminal, personal digital assistants (PDA), a touch panel, a game machine, etc., capable of executing an application program.

BACKGROUND ART

As such an electronic apparatus, a mobile phone capable of executing a mail application program for transmitting electronic mail and a camera application program for performing a camera shooting is known. In this mobile phone, after storing image data obtained by performing an image shooting with image shooting means such as a CCD camera, etc., in an internal memory by executing a camera application program, the image data can be attached to an electronic mail and sent to a specific person by executing a mail application program. When the mobile phone is made to execute these operations, a user must perform the following key operations. First, after performing a key operation for starting the camera application program, a user performs a key operation for release to shoot a subject, and then performs a key operation for storing image data obtained by shooting in the internal memory. Then, after performing a key operation for ending the camera application program, the user performs a key operation for starting the mail application program and makes the mobile phone display a mail composition screen (input screen), and inputs a destination address, a subject, and a body text by key operations. Furthermore, the user performs a key operation for attaching a file to the electronic mail to select and attach the image data stored in the internal memory to the electronic mail. Thereafter, the user performs a key operation for transmitting the electronic mail. On the other hand, as described in Patent Document 1, a small-sized information processing apparatus including attitude detection means for performing attitude detection is known. This small-sized information processing apparatus detects a tilt angle of the display unit (tilt angle with respect to gravity direction) by a tilt sensor as the attitude detection means when a scroll start switch is depressed. After this detection, a tilt angle of the display unit is detected again by the tilt sensor, and from the tilt angle detected at this time, the tilt angle at the time of depressing (basic attitude data) is subtracted to calculate a relative tilt angle from the time of depressing. Then, based on this relative tilt angle, the screen of the display unit is scrolled. More specifically, from the relative tilt angle, a relative tilt direction of the display unit from the time of depressing is recognized, and a process for scrolling the screen toward a direction corresponding to the tilt direction is performed. Furthermore, a process is also performed for reducing the screen scroll speed when this relative tilt angle is less than a predetermined angle (motion identification data), and increasing the same when the relative angle is not less than the predetermined angle. According to this apparatus, the scroll operation which has been conventionally performed by a key operation is performed by an operation of tilting the main body of the apparatus, so that a user can scroll the screen by operation easier than conventionally.

Patent Document 1: Japanese Unexamined Patent Application Publication No. H07-64754.

As described above, conventionally, when image data obtained by shooting with image shooting means is attached to an electronic mail and sent the mail, it is necessary to perform a number of key operations to perform a series of operations for starting a camera application program, releasing, storing the image data obtained by shooting, ending the camera application program, starting a mail application program, inputting predetermined items in the electronic mail, attaching the image data, and transmitting the mail. When the number of key operations is thus large, convenience for users is deteriorated. In addition, such a large number of key operations are necessary each time the series of operations are performed, and this is very troublesome for users. Therefore, a mobile phone capable of performing the series of operations by a smaller number of key operations is demanded.

Therefore, the present inventors have focused on attitude of a mobile phone when the series of operations is performed as described above. That is, in many cases of image shooting performed by using the camera application program, the attitude of the mobile phone is set so that the screen thereof becomes horizontally long as shown in FIG. 3C, that is, the longitudinal direction of the screen is substantially in the horizontal direction (horizontal attitude). On the other hand, in many cases of using the mail application program, the attitude of the mobile phone is set so that the screen is vertically long as shown in FIG. 3A, that is, the longitudinal direction of the screen is substantially in the vertical direction (vertical attitude). Therefore, when the series of operations is performed, a user starts the camera application program and performs an image shooting by setting the mobile phone to the horizontal attitude, and then uses the mail application program upon setting the mobile phone to the vertical attitude in many cases. Therefore, if the attitude change of the mobile phone during the series of operations can be detected and switching from the camera application program to the mail application program can be performed based on the detection results, at least the key operations for ending the camera application program and starting the mail application program can be omitted. Without limiting the series of operations described above, in the case where after one application program is used, the attitude of the mobile phone is changed and another application program is used, the key operations can be similarly omitted.

The same applies to other electronic apparatus as well as the mobile phone.

For example, in a voice recording/playback apparatus such as a voice recorder, recording is performed by using a recording application program by the apparatus in an attitude laid on a desk in many cases. After recording, in many cases, in order to confirm whether the recorded voice has been properly recorded, the apparatus is held by hand and changed in attitude to play the voice back by using a playback application program. In such a case, if the application program can be switched by detecting the attitude change of the apparatus, at least key operations for ending the recording application program and starting the playback application program can be omitted.

For example, in a digital camera, an image shooting is generally performed by using an image shooting application program by the digital camera in an attitude in which the finder screen is substantially parallel to the vertical direction. Thereafter, in many cases, in order to confirm the shot image, the camera is changed into an attitude in which the finder screen tilts from the vertical direction and the image is displayed by using a display application program. Also in this case, if the application program can be switched by detecting the attitude change of the digital camera, at least key operations for ending the image shooting application program and starting the display application program can be omitted.

Accordingly, it would be desirable to provide an electronic apparatus capable of improving convenience for users by omitting key operations that -have been conventionally necessary for using application programs.

SUMMARY OF THE INVENTION

An electronic apparatus according to the system described herein includes program memory means for memorizing a plurality of application programs and application program execution means for executing an application program read out from the program memory means, wherein the electronic apparatus includes attitude detection means for detecting the attitude of the electronic apparatus, and when detection data obtained by attitude detection performed with the attitude detection means during execution of a first application program or data obtained by computing the detection data changes across a predetermined threshold value, the application program execution means performs an application switching process to execute a second application program.

In this electronic apparatus, when it is determined that detection data detected by the attitude detection means during execution of the first application program or data obtained by computing the detection data (hereinafter, referred to as "detection data, etc." as appropriate) changed across a predetermined threshold value, the second application program is executed. The threshold value is set as, for example, an upper limit, a lower limit, or upper and lower limits of a predetermined range. This predetermined range is set so that an attitude identified from the detection data, etc., in this range matches with a range corresponding to an attitude that the electronic apparatus can normally assume when using the second application program. Therefore, when the normal attitude of the electronic apparatus when using an application program is different between the first application program and the second application program, by changing the attitude of the electronic apparatus so that the detection data, etc., changes across the threshold value during use of the first application program, a user can use the second application program without a key operation. Accordingly, the key operation that has been conventionally necessary for using the second application program subsequently after using the first application program can be omitted and the convenience for users can be improved.

In the electronic apparatus, it is preferable that the electronic apparatus includes data memory means, the first application program is for performing a process for storing data in the data memory means, and the second application program is for reading out the data from the data memory means and performing a specific process by using the readout data. In this electronic apparatus, after the first application program is executed and data is stored in the data memory means, when a user changes the attitude of the electronic apparatus so that the detection data, etc., changes across the threshold value, the second application program is executed and the data is read out from the data memory means, and a specific process using the data is performed. Generally, the series of operations of using an application program for storing data in the data memory means and then reading out the data and performing a specific process by using the data are repeated in many cases. In such a situation, it becomes possible to effectively use the effects of improvement in convenience for users by omitting the key operation by performing an application switching process using an attitude change of the electronic apparatus.

In the electronic apparatus, it is preferable that the electronic apparatus includes image shooting means, and the first application program is a camera application program for performing a process for storing image data obtained by shooting with the image shooting means in the data memory means. In this electronic apparatus, after the first application program is executed and the image data obtained by shooting with the image shooting means is stored in the data memory means, when a user changes the attitude of the electronic apparatus so that detection data, etc., changes across the threshold value without key operation, the second application program is executed and the image data is read out from the data memory means, and a specific process using the image data is performed. Generally, the series of operations of using, the camera application program and then subsequently reading out the image data from the data memory means and performing a specific process using the image data are repeated many times. In such a case, by performing an application switching process by using an attitude change of the electronic apparatus, it becomes possible to widely and effectively use the effects of improvement in convenience for users by omitting the key operations.

In the above-described electronic apparatus, it is preferable that the electronic apparatus includes mail transmission means for transmitting an electronic mail via a network, and the second application program is a mail application program for reading out the data from the data memory means and performing a process for transmitting an electronic mail including the readout data by the mail transmission means. In this electronic apparatus, after the first application program is executed and data is stored in the data memory means, when a user changes the attitude of the electronic apparatus so that the detection data, etc., falls within the predetermined range, the second application program is executed and the data is read out from the data memory means, and a process for transmitting an electronic mail including the data is performed. Generally, the series of operations of using an application program for storing data in the data memory means and then performing a process for reading out the data from the data memory means and transmitting an electronic mail including the data are repeated many times in many cases. In such a case, by performing an application switching process by using an attitude change of the electronic apparatus, it becomes possible to widely and effectively use the effects of improvement in convenience for users by omitting the key operations.

In the electronic apparatus, it is preferable that the electronic apparatus includes preset data memory means for memorizing preset data which associates the first application program and the second application program with the predetermined range that includes at least one of the upper limit and the lower limit set as the threshold value, and the application program execution means reads out the preset data from the preset data memory means after starting the first application program and performs the application switching process based on the readout preset data. In this electronic apparatus, by a simple construction, an application switching process can be performed by the application program execution means.

In the electronic apparatus, it is preferable that three or more application programs are memorized in the program memory means, and regarding each of two or more combinations of two different application programs among the three or more application programs, the preset data memory means memorizes preset data that associates one of the two application program as the first application program and the other as the second application program with a predetermined range including at least one of an upper limit and a lower limit set as the threshold value, and after an application program starts, the application program execution means reads out preset data in which this application program is set as the first application program from the preset data memory means, and performs the application switching process based on the read-out preset data. In this electronic apparatus, concerning two or more combinations of two different application programs, key operations conventionally required for using the second application programs after the first application programs are used can be omitted, so that convenience for users can be further improved.

In the electronic apparatus, it is preferable that the electronic apparatus includes display means, and the application program execution means displays a menu screen for selecting a process to be executed according to the second application program by the application switching process on the display means. In this electronic apparatus, an application switching process for displaying a menu screen for selecting a process to be executed according to the second application program can be executed by a simple configuration.

Another electronic apparatus of the present invention includes program memory means for memorizing application programs, application program execution means for executing an application program read out from the program memory means, and display means, wherein the electronic apparatus includes attitude detection means for detecting the attitude of the electronic apparatus, and the application program execution means switches a menu screen displayed on the display means when detection data obtained by attitude detection performed with the attitude detection means or data obtained by computing the detection data changes across a predetermined threshold value.

In this electronic apparatus, when it is determined that detection data detected by the attitude detection means or data obtained by computing the detection data changed across a predetermined threshold value, a menu screen displayed on display means is switched. Therefore, when a user changes the attitude of the electronic apparatus so that the detection data, etc., changes across the threshold value, the user can switch the menu screen displayed on the display means without key operation. Therefore, the key operation conventionally required for using the application program can be omitted and convenience for users can be improved.

The above-described "electronic apparatus" includes not only a mobile communication terminal but also a Personal Digital Assistants (PDA) and game apparatus, etc. The "mobile communication terminal" includes a GSM (Global System for Mobile Communication) type or a TIA (Telecommunication Industry Association) type mobile phone, a mobile phone standardized by IMT (International Mobile Telecommunication)-2000, a TD-SCDMA (MC: Multi Carrier) type mobile phone that is one of the TD-SCDMA (Time Division Synchronous Code Division Multiple Access) type, a PHS (Personal Handyphone System), etc. The "mobile communication terminal" also includes not only a PHS (Personal Handyphone System) and a car phone, etc. but also a mobile communication terminal added with a mobile phone module. The "electronic apparatus" also includes an electronic apparatus with no communication function.

Control in the electronic apparatus can also be realized by executing a predetermined program in a computer provided therein. The program to be used in this computer may be provided by using a recording medium such as an FD or CD-ROM storing the program as digital information, or may be provided by using a communication network such as a computer network.

The system described herein provides an excellent effect that makes it possible to improve convenience for users by omitting key operations conventionally required for using application programs.

BRIEF DESCRIPTION OF DRAWINGS

FIG. 1 is an explanatory view for describing an entire configuration of a mobile communication system that can be used by mobile phones in the present embodiment.

FIG. 2 is a schematic configuration diagram showing hardware configuration of a download server constituting the mobile communication system.

FIG. 3A is a front view showing an external appearance of the mobile phone in a form for mail composition.

FIG. 3B is an explanatory view showing rotation of a liquid crystal unit of the mobile phone.

FIG. 3 is a front view showing an external appearance of the mobile phone in a form for image shooting.

FIG. 4 is a schematic configuration diagram showing hardware configuration of the mobile phone.

FIG. 5 is a functional block diagram of the mobile phone.

FIG. 6 is a block diagram extracting a main part of the same mobile phone.

FIG. 7 is an explanatory view of a software structure in the mobile phone.

FIG. 8 is a flowchart showing a flow of an application switching process of the mobile phone.

FIG. 9A is a side view of a mobile phone showing a form for camera image shooting in another embodiment.

FIG. 9B is a side view of the mobile phone in a form for mail composition.

DETAILED DESCRIPTION OF VARIOUS EMBODIMENTS

Hereinafter, an embodiment of the present invention will be described with reference to the drawings.

FIG. 1 is an explanatory view for describing an entire configuration of a mobile communication system that can be used by mobile phones can use according to the present embodiment. In this mobile communication system, the mobile phone 20 that a user 1 uses has a configuration capable of executing an application program registered by the user. In the present embodiment, this application is developed according to object-oriented programming, etc., which does not depend on a platform. As such an application program, there are available application programs written in JAVA (registered trademark, the same applies to the description below), application programs written in C++ language, and application programs which work in an application execution environment of BREW (registered trademark, the same applies to the description below). The application program may be a structured program written in C language or assembly language. This mobile phone 20 is connectable to a mobile phone network 10 as a communication network. To this mobile phone network 10, an application program download server (hereinafter, referred to as "download server") 11 as a program providing server is connected. When this download server 11 accepts a download request from the mobile phone 20, the download server 11 transmits an application program relating to this request to the mobile phone 20.

The application program provided from the download server 11 is provided from a developer 2 of the application program. More specifically, for example, from a personal computer, etc., on the application program developer 2 side, the application program is uploaded to the download server 11 via an exclusive line or public line and provided. It is also possible that a recording medium such as an optical disk or magnetic disk on which the developed application program has been recorded is delivered from the application program developer 2 to a communication carrier who manages and operates the download server 11 and the application program in the recording medium is read by the download server 11 and provided. The thus provided application program is registered on the download server 11 in a state that it can be downloaded into the mobile phone 20 via the mobile phone network 10.

FIG. 2 is a schematic configuration diagram showing hardware configuration of the download server 11.

This download server 11 includes a system bus 100, a CPU 101, an internal memory device, an external memory device 104, an input device 105, and an output device 106. The internal memory device is comprised of a RAM 102 and a ROM 103, etc. The external memory device 104 is comprised of a hard disk drive (HDD) or an optical disk drive, etc. The input device 105 is comprised of a mouse, and a keyboard, etc. The output device 106 includes a display and a printer, etc. Furthermore, this download server 11 includes a mobile phone communication device 107 for communicating with the mobile phones 20 of each user 1 via the mobile phone network 10.

Components such as the CPU 101 and the RAM 102 exchange data and program commands, etc., with each other via the system bus 100. A program for operating this download server 11 according to predetermined procedures is memorized in the ROM 103 or the external memory device 104, and it is called out to a work area on the CPU 101 and the RAM 102 and executed as appropriate. In this download server 11, the application program to be provided to the mobile phone 20 is memorized in the external memory device 104. The download server 11 has a function for transmitting the application program memorized in the external memory device 104 to the mobile phone 20 via the mobile phone communication network 10 by cooperation of the CPU 101, RAM 102, and communication device 107, etc., for a mobile phone communication network in response to a download request from the mobile phone 20. This download server 11 may be constructed as an exclusive control unit, or may be constructed by using a general-purpose computer system. It may be constructed by one computer, or may be constructed by connecting a plurality of computers having a plurality of functions, respectively, to each other by a network.

FIG. 3A through FIG. 3C are external appearance views of the mobile phone 20. This mobile phone 20 is a so-called clam shell (folding) type mobile phone in which a liquid crystal unit 20A including the liquid crystal display 27 is rotatably formed around the X-axis in the drawing due to the hinge 20C with respect to the key operation unit 20B including data input keys (numeric keypad, * key, and # key), etc. In this mobile phone 20, as shown in FIG. 3B, the liquid crystal unit 20A is rotatably formed by 180 degrees around the Y-axis in the drawing with respect to the hinge 20C. On the back side in the drawing of the key operation unit 20B, a built-in camera (not shown) is provided. In order to make a phone call or compose and send an electronic mail, the mobile phone 20 is used in the form shown in FIG. 3A. When an image shooting is performed by using the built-in camera, the liquid crystal unit 20A is rotated by 180 degrees from the form of FIG. 3A and the clam shell is closed, and the mobile phone 20 is used in the form shown in FIG. 3C.

FIG. 4 is a schematic configuration diagram showing hardware configuration of the mobile hone 20. This mobile phone 20 includes a system bus 200, a CPU 201, an internal control device comprised of a RAM 202 and a ROM 203, etc., as program memory means, an input device 204, an output device 205, a mobile phone communication device 206, an acceleration sensor 207, a geomagnetic sensor 208, and a camera 209. The components such as the CPU 201 and the RAM 202, etc., via the system bus 200, exchange various data and program commands described later with each other. The input device 204 is comprised of a data input key 21, a call start key 22, a call termination key 23, a scroll key 24, a multifunction key 25, a microphone 26, the liquid crystal unit 20A, a side key (not shown) provided on the side surface of the key operation unit 20B, etc. (see FIG. 3A and FIG. 3B.) The output device 205 is comprised of a liquid crystal display (LCD) 27 as display means and a speaker 28, etc. (see FIG. 3A and FIG. 3B.) The mobile phone communication device 206 is for communication with other mobile phones or the download server 11 via the mobile phone network 10. In addition, the RAM 202 has a platform memory area as a first memory means to be managed by a phone platform described later and an application memory area as a second memory means to be managed in an application execution environment described later.

The acceleration sensor 207 is a triaxial acceleration sensor for detecting accelerations ax and ay in the two directions (the X-axis direction and Y-axis direction in FIG. 3A to FIG. 3C) orthogonal to each other within a plane parallel to the operation surface on which the data input keys are provided and an acceleration az in the normal line direction (the Z-axis direction in FIG. 3A to FIG. 3C) of the plane. This acceleration sensor 207 is mounted on a circuit board that is not shown, provided inside the mobile phone 20, and a known sensor capable of detecting the accelerations $\alpha_x$, $\alpha_y$, and $\alpha_z$ can be used.

Furthermore, the geomagnetic sensor 208 is a triaxial sensor for detecting magnetic field intensity components (magnetic flux density components) of geomagnetism on a three-dimensional coordinate system consisting of the X-axis, the Y-axis, and the Z-axis. In the present embodiment, by using the detection results performed by this geomagnetic sensor 208, the angles $\theta_X$, $\theta_Y$, and $\theta_Z$ around the X-axis, the Y-axis, and the Z-axis are detected. More specifically, a change amount of the geomagnetic direction with respect to a reference geomagnetic direction (reference direction) is detected by using the angles $\theta_X$, $\theta_Y$, and $\theta_Z$ around the X-axis, Y-axis, and Z-axis. Thereby, when the mobile phone changes in attitude from an attitude in which the geomagnetic direction is in the reference direction, the changed attitude can be identified from the respective angles $\theta_X$, $\theta_Y$, and $\theta_Z$. In the description given below, the angle $\theta_X$ around the X-axis is referred to as a pitch angle, the angle $\theta_Y$ around the Y-axis is referred to as a roll angle, and the angle $\theta_Z$ around the Z-axis is referred to as a yaw angle. The yaw angle $\theta_Z$ referred to herein indicates an angle between a horizontal projection Y-axis on a horizontal plane of the Y-axis and the north direction. Therefore, from this yaw angle $\theta_Z$, the direction of the horizontal projection Y-axis of the mobile phone 20 can be recognized. This geomagnetic sensor 208 is also mounted on the circuit board that is not shown, provided inside the mobile phone 20.

The acceleration sensor 207 and the geomagnetic sensor 208 may be constructed as devices separate from the main body of the mobile phone 20. In this case, concerning the acceleration sensor 207 and the geomagnetic sensor 208, an external unit including these sensors 207 and 208 is integrally connected to the main body of the mobile phone 20.

The camera 209 is comprised of a built-in camera whose lens surface is exposed at the back side of the key operation unit 20B. As this built-in camera, a digital compact camera such as a CMOS (Complementary Metal Oxide Semiconductor) camera or a CCD (Charge Coupled Device) camera can be used. In the present embodiment, the built-in camera is fixed to the main body of the mobile phone 20 so that its shooting direction is in the Z-axis direction.

FIG. 5 is a functional block diagram of the mobile phone 20 of the present invention. FIG. 6 is a block diagram extracting a main part of the mobile phone 20. FIG. 7 is an explanatory view of a software structure in the mobile phone 20. This mobile phone 20 includes a phone communication unit 211 and a data communication unit 212 as radio communication means, an operation unit 213 as the key operating means, an application program execution management unit 214 as the application program execution means 220, a main control unit 215, an output unit 216, a sensor detection unit 217 as the attitude detection means 221, and a camera unit 219 as the image shooting means, etc.

The phone communication unit 211 is for radio communication with base stations of the mobile phone network 10 to make phone communication with other mobile phones or fixed line phones, and corresponds to a mobile phone communication device 206, etc., on the hardware configuration described above.

The data communication unit 212 corresponds to the mobile phone communication device 206, etc., on the above-described hardware configuration similarly to the phone communication unit 211. This data communication unit 212 is for exchanging mail with other mobile phones via the mobile phone network 10 or for exchanging electronic mail or browsing web pages on the Internet by being connected to an external communication network such as the Internet via a gateway server from the mobile phone network 10. This data communication unit 212 is also used for downloading an application program provided by the download server 11 via the mobile phone network 10.

The operation unit 213 is comprised of the above-described numeric keypad 21, call start key 22, and call termination key 23, etc., to be operated by the user 1. By operating various keys of the operation unit 213, a user can input data such as a URL into the mobile phone 20, start or terminate calling when an incoming call is received, and select, start, and stop an application program. In addition, by operating various keys of the operation unit 213, a user can download application programs from the download server 11.

The application program execution management unit 214 is comprised of the above-described system bus 200, the CPU 201, and a part of the RAM 202, etc. This application program execution management unit 214 corresponds to an "application execution environment" at the center of the software structure of FIG. 7, provides software such as a class library, an execution environment managing library, and application management to be used for application programs developed according to object-oriented programming, and manages an application program execution environment. This application execution environment is properly selected according to an application program to be executed. For example, when the application program to be executed is written in JAVA, the JAVA application execution environment is selected. When the application program to be executed is a program written in C language that works in a BREW execution environment, the BREW application execution environment is selected. When the application program to be executed is written in JAVA, the JAVA application execution environment is further created on the BREW application execution environment, whereby the application program can be executed.

The application program can be used by calling an f-class library of functions, etc., in the application execution environment via a class library API (application interface). The calling history of the class library of functions, etc., is memorized in an application memory area in the RAM 202 as the program memory means 222 until the virtual execution environment (virtual machine: VM) of the application program is ended. Also, in the application execution environment, various data to be used for the application execution program is also stored in the application memory area. When the various data are used, they are read out from and written on this application memory area. The execution environment management library in the application execution environment can be used by calling a phone platform library in a phone platform described later via a phone platform API.

In the present embodiment, detection data (accelerations $\alpha_x$, $\alpha_y$, and $\alpha_z$, pitch angle $\theta_X$, roll angle $\theta_Y$, and yaw angle $\theta_Z$) detected by the sensor detection unit 217 comprised of the acceleration sensor 207 and the geomagnetic sensor 208, etc., are used in the application program. In a conventional application execution environment, the means for using the detection data in the application program was not provided, so that in the present embodiment, a new class (orientation class) is added to the class library. In this orientation class, methods as command sets including getXGravity( ), getYGravity( ), and getZGravity( ) for acquiring data of the accelerations $\alpha_x$, $\alpha_y$, and $\alpha_x$ and getPitch( ), getRoll( ), and getCompassBearing( ) for acquiring data of the pitch angle $\theta_X$, roll angle $\theta_Y$, and yaw angle $\theta_Z$, etc., are prepared. Therefore, according to the present embodiment, the application program can acquire the detection data by using these methods and use the data.

The main control unit 215 controls the phone communication unit 211, the data communication unit 212, the output unit 216, the sensor detection unit 217 and the camera unit 219, and is comprised of the above-described system bus 200, the CPU 201, and the RAM 202, etc. This main control unit 215 exchanges control commands and various data with the application program execution management unit 214, and performs controlling in cooperation with it. The main control unit 215 corresponds to the "phone platform" on the lowest side of the software structure of FIG. 7, and executes a control program for controlling the phone communication unit 211, etc., and a user interface, and provides a phone platform library. This phone platform enables execution of various execution environment processes in the application execution environment and calling and use of software of application management in the application execution environment via the application management API. When the application execution environment calls the phone platform library via the phone platform API and uses it, the phone platform executes a process corresponding to the phone platform library. For example, the phone platform reads out data memorized in a platform memory area managed by the phone platform in the RAM 202 based on an instruction from the application execution environment using the phone platform library and transfers these data into the application memory area.

The output unit 216 is comprised of the output device 205, etc., including the above-described liquid crystal display 27 and the speaker 28, etc. This output unit 216 displays a web page screen received by the data communication unit 212 on the liquid crystal display 27. The liquid crystal display 27 of this output unit 216 is used for informing a user that the phone communication unit 211 and the data communication unit 212 have received information. More specifically, when the information is received, by the main control unit 215, a receipt informing image is displayed on the liquid crystal display 27 of the output unit 216 or a ring tone is outputted from the speaker 28. Furthermore, during the application execution program that is executed in the application execution environment, this output unit 216 is also used for displaying a menu screen, and outputting music, etc., relating to the execution of the program. For example, when an image shooting is performed by executing a camera application program using the camera unit 219, an image of an image shooting target to be taken by the camera unit 219 is displayed or an informing sound for informing a release timing described later is outputted.

The sensor detection unit 217 is comprised of the acceleration sensor 207 and the geomagnetic sensor 208, etc. This sensor detection unit 217 works under the control of the main control unit 215, and the main control unit 215 acquires the detection data detected by the sensor detection unit. The data of the accelerations $\alpha_x$, $\alpha_y$, and $\alpha_z$ and the data of the pitch angle $\theta_X$, roll angle $\theta_Y$, and yaw angle $\theta_Z$ as the detection data are memorized in the platform memory area of the RAM 202 as described above.

For example, when a user shakes or moves the mobile phone 20 and acceleration is generated in the mobile phone 20, the respective components at the acceleration in the X-axis direction, the Y-axis direction, and the Z-axis direction are detected by the acceleration sensor 207 constituting the sensor detection unit 217. When the detection data is inputted into the main control unit 215, the main control unit 215 can recognize the respective accelerations in the X-axis direction, the Y-axis direction, and the Z-axis direction from the detection data. The data of the accelerations $\alpha_x$, $\alpha_y$, and $\alpha_z$ are temporarily stored in a platform memory area in the RAM 202 by the main control unit 215.

When the attitude of the mobile phone 20 changes, magnetic field intensity components (magnetic flux density components) after the attitude change are detected by the geomagnetic sensor 208 composing the sensor detection unit 217. The sensor detection unit 217 calculates angles $\theta_X$, $\theta_Y$, and $\theta_Z$ after the attitude change from a detection signal detected by the geomagnetic sensor 208. The data of the calculated angles $\theta_X$, $\theta_Y$, and $\theta_Z$ are outputted to the main control unit 215 and temporarily stored in the platform memory area in the RAM 202 by the main control unit 215 as in the case of the accelerations $\alpha_x$, $\alpha_y$, and $\alpha_z$.

When the orientation of the mobile phone 20 changes, magnetic field intensity components (magnetic flux density components) after this orientation change are detected by the geomagnetic sensor 208 constituting the sensor detection unit 217. The sensor detection unit 217 calculates the yaw angle $\theta_Z$ after the orientation change from detection signals detected by the geomagnetic sensor 208. The data of the calculated yaw angle $\theta_Z$ is also outputted to the main control unit 215 and temporarily stored in the platform memory area in the RAM 202 by the main control unit 215.

As a method for acquiring the data of the accelerations $\alpha_X$, $\alpha_Y$, and $\alpha_Z$ and the angles $\theta_X$, $\theta_Y$, and $\theta_Z$ to be stored in the platform memory area from the sensor detection unit 217 by the main control unit 215, the following methods are available. For example, there is an acquisition method in which the main control unit 215 sends a request to the sensor detection unit 217, and in response thereto, the sensor detection unit 217 outputs the data and the main control unit 215 receives the data. Also, for example, an acquisition method may be employed in which data continuously outputted from the sensor detection unit 217 regardless of receiving of a request is received by the main control unit 215 as appropriate. It is also possible to employ an acquisition method in which the main control unit 215 sends a request to the sensor detection unit 217 in response to a request outputted by the application program via the application program execution management unit 214, and in response thereto, the sensor detection unit 217 outputs data and the main control unit 215 receives the data.

The camera unit 219 is comprised of the above-described camera 209, etc. This camera unit 219 works under control of the application program execution management unit 214 that executed a camera application program described later and the main control unit 215, and an image shooting data thereof is first acquired by the main control unit 215. This image shooting data is sent to the output unit 216 in real time via the main control unit 215. Thereby, on the liquid crystal display 27 of the output unit 216, an image as a shooting target is displayed. A user can capture the shooting target while looking at the image displayed on the liquid crystal display 27 when he/she performs an image shooting by using the built-in camera. Then, when the user performs a predetermined release operation on the side key of the operation unit 213, a release command is outputted from the application program execution management unit 214 to the camera unit 219 via the main control unit 215. Thereby, the camera unit 219 images the shooting target, and outputs image data thereof to the application program execution management unit 214 via the main control unit 215. The application program execution management unit 214 stores this image data in an application memory area of the RAM 202 as data memory means.

A control program for creating a phone platform to operate the mobile phone 20 according to predetermined procedures is memorized in the RAM 202 and ROM 203. The basic OS (operating system) programs, programs for creating the application execution environment, and application programs are also memorized in the RAM 202 and the ROM 203. These programs are called out to a work area in the CPU 201 and RAM 202 and executed as appropriate.

Next, an application switching process of the mobile phone 20 as a feature of the present invention will be described. A series of operations when image data obtained by shooting with the built-in camera is attached to an electronic mail and sent will be described, however, the process is not limited thereto.

FIG. 8 is a flowchart showing a flow of an application switching process in the present embodiment. First, when the mobile phone 20 is in the form shown in FIG. 3A, the user 1 operates a key of the operation unit 213 to display an application selection screen for selecting an application program to be executed on the liquid crystal display 27. Then, on the application selection screen, the user selects a camera application program (first application program) to be executed by using the scroll key 24, and depresses the multifunction key 25. Then, into the phone platform shown in FIG. 7, that is, into the main control unit 215 shown in FIG. 6, an application program execution instruction is inputted. Thereby, the main control unit 215 reads out and starts the camera application program (S1). When the application program starts, in the application execution environment shown in FIG. 7, that is, on the application program execution management unit 214 shown in FIG. 6, the application program operates. Thereafter, the user 1 changes the mobile phone 20 from the form of FIG. 3A to the form of FIG. 3C, and holds the mobile phone 20 in the horizontal attitude.

It is also possible for the user 1 to start the camera application program by operating a side key of the operation unit 213 after changing the mobile phone 20 from the form of FIG. 3A to the form of FIG. 3C. It is also possible that a sensor as form detection means for detecting whether the mobile phone 20 is in the form of FIG. 3A or in the form of FIG. 3C is provided at the hinge 20C, and the camera application program starts when the main control unit 215 determines that the mobile phone 20 is in the form of FIG. 3C from the detection results.

The application program to be executed by the application program execution management unit 214 of this mobile phone 20 may be acquired by downloading from the download server 11 or memorized in the RAM 202 or ROM 203 in advance. When acquiring the program by downloading from the download server 11, the user 1 operates a key of the operation unit 213 to access the download server 11. Thereby, a download selection screen for selecting a downloadable application program is displayed on the liquid crystal display 27. Then, on this download selection screen, when the user selects an application program to be executed by using the scroll key 24 and depresses the multifunction key 25, the main control unit 215 controls the data communication unit 212 and downloads the application program from the download server 11. The thus downloaded application program is memorized in the RAM 102 by the main control unit 215.

When the camera application program starts, as described above, on the liquid crystal display 27, an image as a shooting target is displayed. The user captures the shooting target while looking at the image displayed on the liquid crystal display 27, and performs a predetermined release operation on the side key of the operation unit 213 (S2). Then, a release command is outputted from the application program execution management unit 214 to the camera unit 219 via the main control unit 215, and the image data is stored in the RAM 202 by the application program execution management unit 214 (S3).

After the image data is thus stored, the main control unit 215 starts angle data acquisition process for acquiring data (angle data) of a pitch angle $\theta_X$, a roll angle $\theta_Y$, and a yaw angle $\theta_Z$ detected by the sensor detection unit 217 substantially in real time (S4). Then, the main control unit determines whether the respective acquired angle data are within a specified range (predetermined range) (S5). More specifically, preset data corresponding to the started camera application program is read out from the RAM 202 as preset data memory means. This preset data associates the camera application program and the mail application program with the specified range. In the present embodiment, as this preset data, a table of threshold values corresponding to upper limits and lower limits of the respective specified range sorted by application program is used. It is determined whether the respective angle data are within the specified range (predetermined range) identified by readout preset data. More specifically, it is determined whether the respective angle data changed across the threshold values. The specified range in the present embodiment are set to possible range of the respective angle data of the mobile phone 20 substantially in the attitude shown in FIG. 3A. Therefore, after fishing the image shooting, when the user 1 restores the mobile phone 20 from the form of FIG. 3C to the form of FIG. 3A and changes the attitude of the mobile phone 20 to the vertical attitude shown in. FIG. 3A for composing an electronic mail to which the taken image data is attached, the respective angle data detected by the sensor detection unit 217 change across the threshold values and become values within the specified range corresponding to the mail application program.

In the case of the present embodiment, it is assumed that the normal attitude of the mobile phone 20 when using the camera application program is the horizontal attitude shown in FIG. 3C. The horizontal attitude means an attitude in which the X-axis of the mobile phone 20 is substantially in the vertical direction in the case of the present embodiment. On the other hand, the normal attitude of the mobile phone 20 when using the mail application program (second application program) described later is the vertical attitude shown in FIG. 3A. This vertical attitude means an attitude in which the Y-axis of the mobile phone 20 is substantially in the vertical direction in the case of the present embodiment. Therefore, as a method for recognizing such a horizontal attitude or a vertical attitude, data of the above-described accelerations $\alpha_X$, $\alpha_Y$, and $\alpha_Z$ can also be used as well as the above-described angle data. If the acceleration sensor 207 detects gravity acceleration, from the detection result, it can be recognized which of the X-axis or Y-axis of the mobile phone 20 is in the vertical direction. In the present embodiment, it is only required to recognize that the mobile phone 20 is in the vertical attitude shown in FIG. 3A, and as long as this can be recognized, all data of the three angles $\theta_X$, $\theta_Y$, and $\theta_Z$ may not be used. The same applies to the case using the data of the accelerations $\alpha_X$, $\alpha_Y$, and $\alpha_Z$.

In the present embodiment, the specified range corresponding to each application program is set to a range of attitudes that the mobile phone can normally assume when using the corresponding application program. At least one of the upper limit and lower limit of this specified range becomes a threshold value. However, the attitudes that the mobile phone can normally assume slightly differ among users. Therefore, a process for setting the specified range to a range suitable for a user of the mobile phone 20 may be performed at a predetermined timing before the application switching process is performed. As a detailed example of this process, the user holds the mobile phone 20 in an attitude that the mobile phone can normally assume when using the mail application program, and the respective data of angles $\theta_X$, $\theta_Y$, and $\theta_Z$ obtained from the detection results of the attitude detection performed at the predetermined timing by the sensor detection unit 217 are temporarily stored as reference data in the RAM 202 as the reference data memory means. Then, a predetermined range including the reference data, for example, threshold values of upper and lower limits of the predetermined range around the reference data are stored in the RAM 202 as threshold values of upper and lower limits of the specified range corresponding to the mail application program. The same is performed for the camera application program. When the attitude of the mobile phone 20 is detected by using data of accelerations $\alpha_x$, $\alpha_y$, and $\alpha_z$, the same process may be performed for the data of the accelerations $\alpha_x$, $\alpha_y$, and $\alpha_z$.

When the main control unit 215 determines that the angle data detected by the sensor detection unit 217 changed across the threshold values so as to fall within the specified range, based on the preset data, the main control unit reads out and starts the mail application program memorized in the ROM 203 (S6). This program directly works on the phone platform, unlike the camera application program. At this time, the main control unit 215 may perform a process for ending the camera application program, or may leave this working in the background instead of ending it. When the mail application program starts, the main control unit 215 functions as mail transmission means together with the data communication unit 212. Then, the main control unit 215 performs a process for displaying a mail composition screen on the liquid crystal display 27 of the output unit 216 according to the contents of the mail application program (S7). Then, the main control unit 215 performs a mail composition process according to the contents of key operations on the operation unit 213 by the user 1 (S8), and performs a mail composition process according to a transmission operation for transmitting an electronic mail composed by the user 1 (S9).

The mail composition screen is a screen for composing an electronic mail to be sent. In the present embodiment, on a menu screen for mail composition displayed first after the mail application program starts, link images linked to an input screen for inputting a destination address, an input screen for inputting a subject, an input screen for inputting a text, and a selection screen for selecting an image data to be attached are displayed. When a user operates the scroll key 24 to select a link image and moves to each screen and inputs necessary information, in response to these key operations, the main control unit 215 performs a mail composition process. In the present embodiment, to an electronic mail relating to the mail composition screen displayed immediately after the mail application program starts, image data stored immediately before this start is automatically selected as an attached file. That is, in the case of the present embodiment, it is not necessary for the user 1 to perform a key operation for selecting the image data as an attached file.

In the present embodiment, a screen displayed first after the mail application program starts is a screen on which link images to various screens are displayed, however, it may be another mail composition screen. For example, the above-described various input screens and selection screen may be displayed immediately after the mail application program starts.

As described above, according to the present embodiment, by changing the attitude of mobile phone 20 into the form shown in FIG. 3A and holding it by a user 1 in the vertical attitude after the user 1 performs an image shooting by holding the mobile phone 20 in the form shown in FIG. 3C in the horizontal attitude, the mail application program automatically starts. That is, when the user 1 intends to send an electronic mail to which taken image data is attached, after performing the an image shooting, he/she can start an operation for mail composition immediately after the mail application program starts without a key operation.

A preferred embodiment of the present invention is described above, however, various changes can be added to the disclosed embodiment within the scope of the technical matters described in the claims without deviating from the scope or spirit of the present invention.

For example, in the above-described embodiment, after the an image shooting is performed while the mobile phone 20 is held in the horizontal attitude as shown in FIG. 3C, by holding the mobile phone 20 in the vertical attitude as shown in FIG. 3A, a predetermined application program automatically starts, however, the attitude change of the mobile phone 20 used for the automatic starting of the application program is not limited to the change from the horizontal attitude of FIG. 3C to the vertical attitude of FIG. 3A.

FIG. 9A and FIG. 9B are side views of the mobile phone 20 showing another attitude change used for automatically starting the application program. In this example, as shown in FIG. 9A, in the attitude in which the mobile phone 20 is in a vertical attitude, that is, the display surface is along the vertical direction, an image shooting is performed. After the an image shooting is finished, as shown in FIG. 9B, the attitude of the mobile phone 20 is changed to the attitude tilted by 90 degrees, that is, the attitude in that the display surface is along the horizontal direction. In response to this attitude change, the mail application program automatically starts, and the screen displayed on the display is automatically switched from the menu screen for camera image shooting to the menu screen for mail composition. Also in this case, when the user 1 sends an electronic mail to which the taken image data is attached, he/she can start an operation for mail composition immediately after the mail application program starts without a key operation after the image shooting. The change of the mobile phone 20 from the attitude of FIG. 9A to the attitude of FIG. 9B can be determined from changes in angles $\theta_X$, $\theta_Y$, and $\theta_Z$ outputted from the sensor detection unit 217. The change of the mobile phone 20 from the attitude of FIG. 9A to the attitude of FIG. 9B can be determined from a change in gravity acceleration outputted from the sensor detection unit 217.

The above-described camera application program and mail application program may be programs executed by the application program execution management unit 214 (programs which operate in an application execution environment) or may be programs executed by the main control unit 215 (programs which directly operate on the phone platform).

In the present embodiment, an application switching process from the camera application program to the mail application program is described by way of example, however, instead of or along with this application switching process, another application switching process may be performed. In order to realize a mobile phone 20 capable of performing two application switching processes, preset data concerning the respective application switching processes are memorized in the RAM 202, and after an application program starts, preset data setting the application program as an application program (first application program) before being switched is read out from the RAM 202, and based on the readout preset data, an application switching process may be performed.

Without limiting to the above-described mobile phone 20, the system described herein is also applicable to a wide range of electronic apparatuses. For example, when the system described herein is applied to a voice recording/playback apparatus such as the voice recorder mentioned above, it becomes possible to perform a process in which, after recording is performed by using a recording application program while the apparatus is set in an attitude laid on a desk, based on the detection results performed by the above-described sensor detection unit 217, it is determined whether the apparatus has turned into a normal attitude for use of a playback application program, and when it is determined that the apparatus turned into the normal attitude, the playback application program is automatically started. In this case, simultaneously with the automatic starting, the recorded voice may be automatically played back. For example, when the system described herein is applied to a digital camera, it becomes possible that an image shooting is performed by using an image shooting application program with the digital camera in an attitude in which the finder screen is substantially parallel to the vertical direction, based on the detection results performed by the above-described sensor detection unit 217, it is determined whether the camera has turned into a normal attitude for use of a display application program, and when it is determined that the camera has turned into the normal attitude, the display application program can be automatically started. In this case, simultaneously with this automatic starting, the taken image data may be displayed on the screen.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

The invention claimed is:

1. An electronic apparatus, comprising:
   image shooting means;
   program memory means for storing a plurality of application programs;
   application program execution means for executing an application program read out from the program memory means; and
   attitude detection means for detecting the attitude of the electronic apparatus,
   wherein the application program execution means is configured to perform an application switching process to execute a mail application program during execution of a camera application program and automatically select image data captured by the image shooting means and stored by the camera application program as an attachment to a mail composition when the attitude detection means detects a change in the attitude of the electronic apparatus.

2. The electronic apparatus according to claim 1, further comprising:
   mail transmission means for transmitting the mail composition via a network.

3. The electronic apparatus according to claim 1, further comprising:
   preset data memory means for storing preset data that associates the camera application program and the mail application program with a predetermined range including at least one of an upper limit and a lower limit set as a predetermined threshold value, wherein the application program execution means reads out the preset data from the preset data memory means after starting the camera application program, and performs the application switching process based on the readout preset data.

4. The electronic apparatus according to claim 3, wherein the program memory means stores three or more application programs,
   the preset data memory means stores preset data that associates, regarding each of two or more different combinations including two application programs among the three or more different application programs, one of the two application programs as the camera application program and the other as the mail application program with a predetermined range including at least one of an upper limit and a lower limit set as the predetermined threshold value, and
   after starting an application program, the application program execution means reads out preset data in which the application program is set as the camera application program from the preset data memory means, and performs the application switching process based on the readout preset data.

5. The electronic apparatus according to claim 1, further comprising:
   display means, wherein the application program execution means displays a menu screen for selecting a process to be executed according to the mail application program on the display means.

6. An electronic apparatus, comprising:
   at least one memory that stores a plurality of application programs;
   a processor for executing an application program stored in the memory; and
   a sensor for detecting a position of the electronic apparatus,
   wherein the processor performs an application switching process to execute a mail application program during execution of a camera application program and automatically select image data stored by the camera application program as an attachment to a mail composition when data detected by the sensor changes across a threshold value.

7. The electronic apparatus according to claim 6, further comprising:
   a data memory, wherein the camera application program is for performing a process for storing data in the data memory, and the mail application program is for reading out the data from the data memory and performing a specific process by using the readout data.

8. The electronic apparatus according to claim 6, further comprising:
   a camera, wherein the camera application program stores image data obtained by the camera.

9. The electronic apparatus according to claim 6, further comprising:
   a data communicator for transmitting the mail composition via a network, wherein the mail application program reads out the data from a data memory and performs a process for transmitting the mail composition including the readout data.

10. The electronic apparatus according to claim 6, further comprising:
    a preset data memory for storing preset data that associates the camera application program and the mail application program with a predetermined range including at least one of an upper limit and a lower limit set as the threshold value, wherein the application program execution means reads out the preset data from the preset data memory after starting the camera application program, and performs the application switching process based on the readout preset data.

11. The electronic apparatus according to claim 10, wherein the at least one memory stores at least three application programs, wherein one of the at least three application programs is set as the camera application program and another of the at least three application programs is set as the mail application program.

12. The electronic apparatus according to claim 6, further comprising:
    a display, wherein the processor displays a menu screen for selecting a process to be executed according to the mail application program on the display.

* * * * *